US012811154B2

(12) United States Patent
Visbal

(10) Patent No.: US 12,811,154 B2
(45) **Date of Patent: *Nov. 24, 2026**

(54) BATTERY ELECTRIC VEHICLE COMPRISING AN ELECTRODE

(71) Applicant: TOYOTA JIDOSHA KABUSHIKI KAISHA, Toyota (JP)

(72) Inventor: Heidy Visbal, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

This patent is subject to a terminal disclaimer.

(21) Appl. No.: 18/743,205

(22) Filed: Jun. 14, 2024

(65) Prior Publication Data

US 2024/0332533 A1 Oct. 3, 2024

Related U.S. Application Data

(63) Continuation of application No. 17/545,422, filed on Dec. 8, 2021, now Pat. No. 12,046,757.

(30) Foreign Application Priority Data

Dec. 10, 2020 (JP) ................................ 2020-205170

(51) Int. Cl.

| | |
|---|---|
| ***H01M 4/62*** | (2006.01) |
| ***H01M 4/02*** | (2006.01) |
| ***H01M 4/13*** | (2010.01) |
| ***H01M 10/052*** | (2010.01) |

(52) U.S. Cl.

CPC ............. *H01M 4/624* (2013.01); *H01M 4/13* (2013.01); *H01M 10/052* (2013.01); *H01M 2004/021* (2013.01)

(58) Field of Classification Search

None

See application file for complete search history.

(56) References Cited

U.S. PATENT DOCUMENTS

| | | | | |
|---|---|---|---|---|
| 8,558,655 | B1 | 10/2013 | Chen | |
| 2007/0046420 | A1 | 3/2007 | Hirano et al. | |
| 2008/0038642 | A1 | 2/2008 | Kwak et al. | |
| 2011/0281160 | A1 * | 11/2011 | Doi .................. | H01M 10/0585 429/211 |
| 2017/0207440 | A1 | 7/2017 | Hama et al. | |
| 2019/0123355 | A1 | 4/2019 | Ebisuzaki et al. | |
| 2020/0036009 | A1 | 1/2020 | Ose et al. | |

FOREIGN PATENT DOCUMENTS

| | | | |
|---|---|---|---|
| CN | 106205912 | A | 12/2016 |
| CN | 106981664 | A | 7/2017 |
| JP | 2017130283 | A | 7/2017 |
| JP | 2019079611 | A | 5/2019 |
| KR | 20080107142 | A | 12/2008 |
| KR | 1020200012769 | A | 2/2020 |
| WO | 2018/003350 | A1 | 1/2018 |

OTHER PUBLICATIONS

Zhi-Min Dang, et al., "Electrical property and microstructure analysis of poly (vinylidene fluoride)-based composites with different conducting fillers", Chemical Physics Letters 438 (2007), p. 196-202 (Available online Mar. 2, 2007).

Kono, A, Shimizu, K., Nakano, H., Yamamoto, M., Goto, Y., Takahashi, S., Ougizawa, T., Horibe, H.—Development of Ni particle dispersed poly(methylmethacrylate) composites exhibiting conductor/insulator transition by the positive temperature coefficient effect of electrical resistivity, 2013 (Year: 2013).

Nakano, H., Shimizu, K., Takahashi, S., Kono, A, Ougizawa, T.—Resistivity-temperature characteristics of filler-dispersed polymer composites, Polymer 53 (2012), pp. 6112-6117 (Year: 2012).

Pourabbas, B., Peighambardoust, S., J.—PTC Effect in HOPE Filled with Carbon Blacks Modified by Ni and Au Metallic Particles , Journal of Applied Polymer Science, vol. 105, 1031-1042, 2007 (Year: 2007).

Chen Zheng et al: "Fast and reversible thermoresponsive polymer switching materials for safer batteries", Nature Energy, vol. 1 No. 1, Jan. 2016 (Jan. 2016), pp. 15009, 1-8, XP055914824, DOI: 10.1038/nenergy.2015.9.

Li, J., Chen, J., Lu, H., Jia, M., Jiang, L., Lai, Y, Zhang, Z,—A Positive-Temperature-Coefficient Layer Based on Ni-Mixed Poly ( Vinylidene Fluoride) Composites for LiFeO4 Electrode, Int.J. Electrochem. Sci. 8 (2013) pp. 5223-5231 (Year: 2013).

Machine translation of CN 106205912, published on Dec. 7, 2018 (Year: 2018).

Heidy Visbal, U.S. Appl. No. 17/545,422, filed Dec. 8, 2021.

Heidy Visbal, U.S. Appl. No. 17/545,422, Non-Final Office Action dated Jan. 25, 2024.

Heidy Visbal, U.S. Appl. No. 17/545,422, Notice of Allowance dated May 13, 2024.

* cited by examiner

*Primary Examiner* — Anca Eoff

(74) *Attorney, Agent, or Firm* — Dickinson Wright, PLLC

(57) ABSTRACT

An electrode configured to decrease the heat generation amount of solid-state batteries is provided. An electrode for solid-state batteries is provided, wherein the electrode comprises an electrode layer, a current collector, and a PTC layer which is disposed between the electrode layer and the current collector and which is in contact with the electrode layer; wherein the PTC layer contains an electroconductive material, Ni and a polymer; and wherein a volume percent of the Ni in the PTC layer is larger than a volume percent of the electroconductive material in the PTC layer.

6 Claims, 1 Drawing Sheet

BATTERY ELECTRIC VEHICLE COMPRISING AN ELECTRODE

RELATED APPLICATIONS

This application is a continuation of U.S. patent application Ser. No. 17/545,422, filed Dec. 8, 2021, which claims priority to JP Patent Application No. 2020-205170, filed Dec. 10, 2020, the entire disclosure of which is incorporated herein in its entirety.

TECHNICAL FIELD

The disclosure relates to an electrode.

BACKGROUND

Recently, with the rapid spread of information-related devices and communication devices such as personal computers, video cameras and mobile phones, the development of batteries for use as the power source of the devices, is increasingly important. Also, in the automotive industry, etc., the development of high-power and high-capacity batteries for battery-powered electric vehicles or hybrid electric vehicles has been promoted.

Among batteries, a lithium secondary battery has attracted attention for the following reason: since lithium, which has the largest ionization tendency among metals, is used as the anode, a potential difference from the cathode is large, and a high output voltage is obtained.

Also, a solid-state battery has attracted attention for the following reason: as the electrolyte interposed between the cathode and the anode, a solid electrolyte is used instead of an electrolytic solution containing an organic solvent.

Patent Literature 1 discloses an all-solid battery including a PTC layer. Patent Literature 1 also discloses that the PTC layer includes a polymer, a conductive material and an insulating inorganic substance.

Non-Patent Literature 1 discloses that the resistance increase temperature of a polymer is decreased by adding Ni to a PTC layer, while the melting temperature thereof remains unchanged.

Patent Literature 1: Japanese Patent Application Laid-Open No. 2019-079611

Non-Patent Literature 1: Zhi-Min Dang, et al., Chemical Physics Letters 438(2007) 196-202

A solid-state battery is required to decrease a heat generation amount.

SUMMARY

The disclosed embodiments were achieved in light of the above circumstances. An object of the disclosed embodiments is to provide an electrode configured to decrease the heat generation amount of solid-state batteries.

In a first embodiment, there is provided an electrode for solid-state batteries,

- wherein the electrode comprises an electrode layer, a current collector, and a PTC layer which is disposed between the electrode layer and the current collector and which is in contact with the electrode layer;
- wherein the PTC layer contains an electroconductive material, Ni and a polymer; and
- wherein a volume percent of the Ni in the PTC layer is larger than a volume percent of the electroconductive material in the PTC layer.

A volume ratio (Ni/electroconductive material) of the Ni to the electroconductive material in the PTC layer, may be more than 1 and 3 or less.

The volume percent of the Ni in the PTC layer may be from 30 volume % to 35 volume %.

An average particle diameter of particles of the Ni may be from 63 nm to 150 nm.

According to the disclosed embodiments, an electrode configured to decrease the heat generation amount of solid-state batteries, is provided.

BRIEF DESCRIPTION OF THE DRAWINGS

In the accompanying drawings.

DETAILED DESCRIPTION

Figure 1:
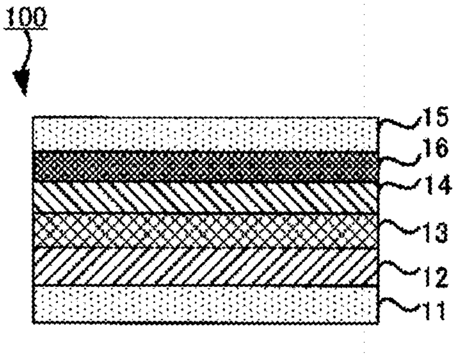
FIG. 1 is a schematic cross-sectional view of an example of the solid-state battery of the disclosed embodiments.

The electrode of the disclosed embodiments is an electrode for solid-state batteries,

- wherein the electrode comprises an electrode layer, a current collector, and a PTC layer which is disposed between the electrode layer and the current collector and which is in contact with the electrode layer;
- wherein the PTC layer contains an electroconductive material, Ni and a polymer; and
- wherein a volume percent of the Ni in the PTC layer is larger than a volume percent of the electroconductive material in the PTC layer.

The "PTC" means a "positive temperature coefficient". The "PTC layer" means a layer having the following PTC characteristics: along with an increase in temperature, electronic resistance changes while having a positive coefficient.

By adding Ni to the electrode, a decrease in battery resistance can be achieved, and a PTC function can be exerted.

The electrode of the disclosed embodiments comprises an electrode layer, a current collector, and a PTC layer which is disposed between the electrode layer and the current collector and which is in contact with the electrode layer The electrode of the disclosed embodiments may be used as at least any one of a cathode and an anode, or it may be used as both of them.

The electrode layer is a cathode layer or an anode layer. It is decided by the type of an active material contained in the electrode layer, whether the electrode layer is a cathode layer or an anode layer. As the active material, examples include those exemplified below as cathode and anode active materials.

When the electrode layer is a cathode layer, the current collector is a cathode current collector. When the electrode layer is an anode layer, the current collector is an anode current collector.

In the disclosed embodiments, the PTC layer is disposed at least at one of the following positions: a position between the cathode layer and the cathode current collector and a position between the anode layer and the anode current collector. The PTC layer contains an electroconductive material, Ni and a polymer.

The thickness of the PTC layer is not particularly limited and may be from 500 nm to 20 μm. In the disclosed embodiments, the thickness of the PTC layer is the average thickness, and it can be measured by use of a film thickness measuring device, for example. The thickness of the PTC layer can be measured from a sectional image of the PTC layer observed by use of a scanning electron microscope (SEM).

The volume percent of the Ni in the PTC layer is larger than the volume percent of the electroconductive material in the PTC layer.

When the volume percent of the electroconductive material in the PTC layer is deemed as 1, the volume percent of the Ni in the PTC layer may be more than 1 and 5 or less or 3 or less. That is, the volume ratio (Ni/electroconductive material) of the Ni to the electroconductive material in the PTC layer, may be more than 1 and 5 or less or 3 or less.

The volume percent of the Ni in the PTC layer may be from 20 volume % to 50 volume %, or it may be from 30 volume % to 35 volume %.

The average particle diameter of the particles of the Ni may be from 20 nm to 200 μm, or it may be from 63 nm to 150 nm.

The dielectric constant and resistance of the current collector can be controlled by combining the PTC layer with nickel and a carbonaceous material which is used as the electroconductive material.

In liquid batteries, nickel dissolves at high potential (4.3 V or more). Accordingly, it is difficult to use nickel as a material for the PTC layer. In solid-state batteries, nickel does not diffuse even at high potential. Accordingly, it can be used as a material for the PTC layer.

The electroconductive material is not particularly limited, as long as it is a material having the desired electron conductivity, such as a carbonaceous material. As the carbonaceous material, examples include, but are not limited to, carbon black such as furnace black, Acetylene Black, Ketjen Black and thermal black, carbon fiber such as carbon nanotube and carbon nanofiber, activated carbon, graphite, graphene and fullerene. Of them, carbon black may be used as the electroconductive material, since carbon black is advantageous in that the electron conductivity is high with respect to the added amount. The form of the electroconductive material is not particularly limited. For example, the form may be a particulate form. The average primary particle diameter of the electroconductive material may be 20 nm or more and 1 μm or less, for example. The average primary particle diameter of the electroconductive material can be obtained as follows, for example: the primary particle diameters of 30 or more particles are measured by image analysis using an electron microscope such as a scanning electron microscope (SEM); the arithmetic mean value of them is obtained; and the thus-obtained arithmetic mean value is employed as the average primary particle diameter of the electroconductive material.

The amount of the electroconductive material contained in the PTC layer is not particularly limited, and it may be from 1 volume % to 15 volume %. This is because, when the amount of the contained electroconductive material is too small, there is a possibility that the number of electroconductive paths thus formed decreases, and the electron conductivity of the PTC layer decreases. Also, this is because, when the amount of the contained electroconductive material is too large, there is a possibility that due to volume expansion of the polymer, the distance between the particles of the electroconductive material cannot be increased, and an insufficient increase in electronic resistance is obtained.

The polymer is not particularly limited, as long as it can cause volume expansion during a temperature increase. For example, the polymer may be a thermoplastic resin. As the thermoplastic resin, examples include, but are not limited to, polyvinylidene fluoride (PVDF), polypropylene, polyethylene, polyvinyl chloride, polystyrene, acrylonitrile butadiene styrene (ABS) resin, methacrylic resin, polyamide, polyester, polycarbonate and polyacetal.

The melting point of the polymer may be a temperature higher than the temperature of the battery in normal use. For example, the melting point may be 80° C. or more and 300° C. or less, or it may be 100° C. or more and 250° C. or less. The melting point can be measured by differential thermal analysis (DTA), for example.

The amount of the polymer contained in the PTC layer is not particularly limited, and it may be from 30 volume % to 65 volume %. This is because, when the amount of the contained polymer is too small, there is a possibility that due to volume expansion of the polymer, the distance between the particles of the electroconductive material cannot be increased, and an insufficient increase in electronic resistance is obtained. Also, this is because, when the amount of the contained polymer is too large, there is a possibility that electroconductive paths which are formed by the electroconductive material, may be blocked by the polymer, and the electron conductivity of the PTC layer decreases.

The electrode can be produced by the following production method, for example. First, Ni, the above-described electroconductive material, and the above-described polymer are mixed with an organic solvent such as N-methylpyrrolidone to form a slurry. The slurry is applied on the current collector. The applied slurry is dried and sintered to form the PTC layer on the current collector. Then, a mixture for forming the electrode layer containing an electrode active material is disposed on the PTC layer to form the electrode layer, thereby obtaining the electrode including the current collector, the PTC layer and the electrode layer in this sequence.

The electrode may be fixed at a fixing pressure of from 50 Nm to 200 Nm.

The electrode of the disclosed embodiments is an electrode for solid-state batteries.

FIG. 1 is a schematic cross-sectional view of an example of the solid-state battery of the disclosed embodiments.

As shown in FIG. 1, a solid-state battery 100 includes an anode current collector 11, an anode layer 12, a solid electrolyte layer 13, a cathode layer 14 and a cathode current collector 15 in this sequence. It also includes a PTC layer 16 between the cathode current collector 15 and the cathode layer 14.

[Cathode]

The cathode includes the cathode layer and the cathode current collector. As needed, the cathode may include the PTC layer between the cathode layer and the cathode current collector. That is, the cathode may be the electrode of the disclosed embodiments.

[Cathode Layer]

The cathode layer contains a cathode active material. As optional components, the cathode layer may contain a solid electrolyte, a conductive material, a binder, etc.

There is no particular limitation on the type of the cathode active material, and any material which can be used as an active material of a solid-state battery can be employed. When the solid-state battery is a solid-state lithium secondary battery, as the cathode active material, examples include, but are not limited to, lithium metal (Li), a lithium alloy, $LiCoO_2$, $LiNi_{0.8}Co_{0.15}Al_{0.05}O_2$, $LiNi_xCo_{1-x}O_2$ ($0<x<1$), $LiNi_{1/3}Co_{1/3}Mn_{1/3}O_2$, $LiMnO_2$, a different element-substituted Li—Mn spinel, lithium titanate, lithium metal phosphate, LiCoN, $Li_2SiO_3$, and $Li_4SiO_4$, a transition metal oxide, $TiS_2$, Si, $SiO_2$, a Si alloy and a lithium storage intermetallic compound. As the different element-substituted Li—Mn spinel, examples include, but are not limited to, $LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$, and $LiMn_{1.5}Zn_{0.5}O_4$. As the lithium titanate, examples include, but are not limited to, $Li_4Ti_5O_{12}$. As the lithium metal phosphate, examples include, but are not limited to, $LiFePO_4$, $LiMnPO_4$, $LiCoPO_4$ and $LiNiPO_4$. As the transition metal oxide, examples include, but are not limited to, $V_2O_5$ and $MoO_3$. As the lithium storage intermetallic compound, examples include, but are not limited to, $Mg_2Sn$, $Mg_2Ge$, $Mg_2Sb$ and $Cu_3Sb$.

As the lithium alloy, examples include, but are not limited to, Li—Au, Li—Mg, Li—Sn, Li—Si, Li—Al, Li—B, Li—C, Li—Ca, Li—Ga, Li—Ge, Li—As, Li—Se, Li—Ru, Li—Rh, Li—Pd, Li—Ag, Li—Cd, Li—In, Li—Sb, Li—Ir, Li—Pt, Li—Hg, Li—Pb, Li—Bi, Li—Zn, Li—Tl, Li—Te and Li—At. As the Si alloy, examples include, but are not limited to, an alloy of Si and a metal such as Li, and an alloy of Si and at least one kind of metal selected from the group consisting of Sn, Ge and Al.

The form of the cathode active material is not particularly limited. It may be a particulate form. When the cathode active material is in a particulate form, the cathode active material may be primary particles or secondary particles. The average particle diameter (D50) of the cathode active material may be 1 nm or more and 100 μm or less, or it may be 10 nm or more and 30 μm or less, for example.

On the surface of the cathode active material, a coating layer containing a Li ion conductive oxide may be formed. This is because a reaction between the cathode active material and the solid electrolyte can be suppressed.

As the Li ion conductive oxide, examples include, but are not limited to, $LiNbO_3$, $Li_4Ti_5O_{12}$, and $Li_3PO_4$. The thickness of the coating layer is, for example, 0.1 nm or more, and it may be 1 nm or more. On the other hand, the thickness of the coating layer is, for example, 100 nm or less, and it may be 20 nm or less. The coating rate of the coating layer on the surface of the cathode active material is, for example, 70% or more, and it may be 90% or more.

As the solid electrolyte, examples include, but are not limited to, those exemplified below in [Solid electrolyte layer].

The amount of the solid electrolyte contained in the cathode layer is not particularly limited. It may be within a range of, for example, from 1 mass % to 80 mass % of the total mass (100 mass %) of the cathode layer.

As the conductive material, a known material can be used, such as a carbon material and metal particles. As the carbon material, examples include, but are not limited to, at least one selected from the group consisting of acetylene black, furnace black, VGCF, carbon nanotube and carbon nanofiber. Among them, at least one selected from the group consisting of VGCF, carbon nanotube and carbon nanofiber may be used, from the viewpoint of electron conductivity. As the metal particles, examples include, but are not limited to, particles of Ni, Cu, Fe and SUS.

The amount of the conductive material contained in the cathode layer is not particularly limited.

As the binder, examples include, but are not limited to, acrylonitrile butadiene rubber (ABR), butadiene rubber (BR), polyvinylidene fluoride (PVdF) and styrene butadiene rubber (SBR). The amount of the binder contained in the cathode layer is not particularly limited.

The thickness of the cathode layer is not particularly limited.

The cathode layer can be formed by a conventionally known method.

For example, the cathode active material and, as needed, other components are put in a solvent; they are stirred to prepare a slurry for a cathode layer; and the slurry for the cathode layer is applied on one surface of a support such as a cathode current collector; and the applied slurry is dried, thereby obtaining the cathode layer.

As the solvent, examples include, but are not limited to, butyl acetate, butyl butyrate, heptane, and N-methyl-2-pyrrolidone (NMP).

The method for applying the slurry for the cathode layer on one surface of the support such as the cathode current collector, is not particularly limited. As the method, examples include, but are not limited to, the doctor blades method, the metal mask printing method, the static coating method, the dip coating method, the spread coating method, the roll coating method, the gravure coating method, and the screen printing method.

As the support, one having self-supporting property can be appropriately selected and used without particular limitation. For example, a metal foil such as Cu and Al can be used.

As another method for forming the cathode layer, the cathode layer may be formed by pressure molding a cathode mixture powder containing the cathode active material and, as needed, other components. In the case of pressure molding the cathode mixture powder, generally, a press pressure of about 1 MPa or more and 600 MPa or less is applied.

The method for applying the pressure is not particularly limited. As the method, examples include, but are not limited to, a pressure applying method using a plate press machine, a roll press machine, or the like.

[Cathode Current Collector]

As the cathode current collector, a known metal that can be used as the current collector of a solid-state battery, can be used. As the metal, examples include, but are not limited to, a metal material containing one or more elements selected from the group consisting of Cu, Ni, Al, V, Au, Pt, Mg, Fe, Ti, Co, Cr, Zn, Ge and In. As the cathode current collector, examples include, but are not limited to, SUS, aluminum, nickel, iron, titanium and carbon.

The form of the cathode current collector is not particularly limited. As the form, examples include, but are not limited to, various kinds of forms such as a foil form and a mesh form. The thickness of the cathode current collector varies depending on the shape. For example, it may be in a range of from 1 μm to 50 μm, or it may be in a range of from 5 μm to 20 μm.

[Anode]

The anode includes the anode current collector and the anode layer. As needed, it may further include a PTC layer between the anode layer and the anode current collector. That is, the anode may be the electrode of the disclosed embodiments.

[Anode Layer]

The anode layer contains at least an anode active material. As needed, it contains an electroconductive material, a binder, a solid electrolyte, etc.

As the anode active material, examples include, but are not limited to, graphite, mesocarbon microbeads (MCMB), highly oriented pyrolytic graphite (HOPG), hard carbon, soft carbon, elemental lithium, a lithium alloy, elemental Si, a Si alloy and $Li_4Ti_5O_{12}$. As the lithium alloy and the Si alloy, those exemplified above as the cathode active material may be used.

The form of the anode active material is not particularly limited. As the form, examples include, but are not limited to, a particulate form and a plate form. When the anode active material is in a particulate form, the anode active material may be primary particles or secondary particles. The average particle diameter (D50) of the anode active material may be 1 nm or more and 100 μm or less, or it may be 10 nm or more and 30 μm or less, for example.

As the electroconductive material and binder used in the anode layer, those exemplified above as the electroconductive material and binder used in the cathode layer, may be used. As the solid electrolyte used in the anode layer, those exemplified below as the solid electrolyte used in the solid electrolyte layer, may be used.

The thickness of the anode layer is not particularly limited. For example, it may be from 10 μm to 100 μm.

The amount of the anode active material contained in the anode layer is not particularly limited. It may be from 20 mass % to 90 mass %, for example.

[Anode Current Collector]

The material for the anode current collector may be a material that is not alloyed with Li, such as SUS, copper and nickel. As the form of the anode current collector, examples include, but are not limited to, a foil form and a plate form. The plan-view shape of the anode current collector is not particularly limited, and examples thereof include, but are not limited to, a circular shape, an ellipse shape, a rectangular shape and any arbitrary polygonal shape. The thickness of the anode current collector varies depending on the shape. For example, it may be in a range of from 1 μm to 50 μm, or it may be in a range of from 5 μm to 20 μm.

[Solid Electrolyte Layer]

The solid electrolyte layer contains at least a solid electrolyte.

As the solid electrolyte contained in the solid electrolyte layer, a conventionally-known solid electrolyte that is applicable to solid batteries can be appropriately used, such as an oxide-based solid electrolyte and a sulfide-based solid electrolyte. In the disclosed embodiments, a sulfide-based solid electrolyte may be used as the solid electrolyte. A sulfide-based solid electrolyte has high ion conductivity; meanwhile, it may produce hydrogen sulfide along with temperature increase. Accordingly, by using the PTC layer to increase electronic resistance and effectively suppress temperature increase, the solid-state battery of the disclosed embodiments can be a solid-state battery which has, with suppressing the production of hydrogen sulfide, high ion conductivity.

As the sulfide-based solid electrolyte, examples include, but are not limited to, $Li_2S—P_2S_5$, $Li_2S—SiS_2$, $LiX—Li_2S—SiS_2$, $LiX—Li_2S—P_2S_5$, $LiX—Li_2O—Li_2S—P_2S_5$, $LiX—Li_2S—P_2O_5$, $LiX—Li_3PO_4—P_2S_5$ and $Li_3PS_4$. Note that the description "$Li_2S—P_2S$" means a material consisting of a raw material composition including $Li_2S$ and $P_2S_5$, and the same applies to other descriptions. Also, "X" of the above-described LiX indicates a halogen element. The raw material composition may contain one or two or more kinds of LiX. When two or more kinds of LiX are contained, the mixing ratio of the two or more kinds of LiX is not particularly limited.

The molar ratio of the elements in the sulfide-based solid electrolyte can be controlled by adjusting the amounts of the elements in the raw material. Also, the molar ratio and composition of the elements in the sulfide-based solid electrolyte can be measured by ICP emission spectrometry, for example.

The sulfide-based solid electrolyte may be a sulfide glass, a crystalline sulfide glass (glass ceramic) or a crystalline material obtained by carrying out a solid-phase reaction treatment on the raw material composition.

The crystal state of the sulfide-based solid electrolyte can be confirmed, for example, by carrying out powder X-ray diffraction measurement using CuKα rays on the sulfide-based solid electrolyte.

The sulfide glass can be obtained by carrying out an amorphous treatment on the raw material composition such as a mixture of $Li_2S$ and $P_2S_5$. As the amorphous treatment, examples include, but are not limited to, mechanical milling.

The glass ceramic can be obtained, for example, by heat-treating a sulfide glass.

The heat treatment temperature may be a temperature higher than the crystallization temperature (Tc) observed by thermal analysis measurement of the sulfide glass, and it is generally 195° C. or more. On the other hand, the upper limit of the heat treatment temperature is not particularly limited.

The crystallization temperature (Tc) of the sulfide glass can be measured by differential thermal analysis (DTA).

The heat treatment time is not particularly limited, as long as the desired crystallinity of the glass ceramic is obtained. For example, it is within a range of from one minute to 24 hours, and it may be within a range of from one minute to 10 hours.

The heat treatment method is not particularly limited. As the heat treatment method, examples include, but are not limited to, a heat treatment method using a firing furnace.

As the oxide-based solid electrolyte, examples include, but are not limited to, a substance having a garnet-type crystal structure including, for example, a Li element, a La element, an A element (A is at least one of Zr, Nb, Ta and Al) and an O element. The oxide-based solid electrolyte may be $Li_{3+x}PO_{4-x}N_x$ ($1 \leq x \leq 3$), for example.

The form of the solid electrolyte may be a particulate form, from the viewpoint of good handleability.

The average particle diameter (D50) of the solid electrolyte particles is not particularly limited. The lower limit of the average particle diameter may be 0.5 μm or more, and the upper limit may be 2 μm or less.

In the disclosed embodiments, the average particle diameter of the particles is the value of a volume-based median diameter (D50) measured by laser diffraction and scattering particle size distribution measurement, unless otherwise noted. In the disclosed embodiments, the median diameter (D50) is a diameter (volume average diameter) such that the cumulative volume of the particles is half (50%) of the total volume when the particles are arranged in order of particle diameter from smallest to largest.

The solid electrolyte may be one kind of solid electrolyte, or it may be 2 or more kinds of solid electrolytes. In the case of using 2 or more kinds of solid electrolytes, they may be mixed together, or they may be formed into a layer each to obtain a multilayer structure.

The amount of the solid electrolyte in the solid electrolyte layer is not particularly limited. For example, it may be 50 mass % or more; it may be within a range of 60 mass % or more and 100 mass % or less; it may be within a range of 70 mass % or more and 100 mass % or less; or it may be 100 mass %.

A binder may also be contained in the solid electrolyte layer, from the viewpoint of expressing plasticity, etc. As the binder, examples include, but are not limited to, materials exemplified above as the binder used in the cathode layer. However, to facilitate high output, the binder contained in the solid electrolyte layer may be 5 mass % or less, from the viewpoint of preventing excessive aggregation of the solid electrolyte and enabling the formation of the solid electrolyte layer in which the solid electrolyte is uniformly dispersed.

The thickness of the solid electrolyte layer is not particularly limited, and it is generally 0.1 μm or more and 1 mm or less.

As the method for forming the solid electrolyte layer, examples include, but are not limited to, pressure molding a solid electrolyte material powder containing a solid electrolyte. In the case of pressure molding the solid electrolyte material powder, generally, a press pressure of about 1 MPa or more and 600 MPa or less is applied.

The method for applying the pressure is not particularly limited. As the method, examples include, but are not limited to, the pressure applying method exemplified above in the formation of the cathode layer.

As needed, the solid-state battery includes an outer casing for housing a stack including the cathode current collector, the cathode layer, the solid electrolyte layer, the anode layer and the anode current collector in this sequence, a fixing member, etc.

The material for the outer casing is not particularly limited, as long as it is a material stable in electrolyte. As the material, examples include, but are not limited to, a resin such as polypropylene, polyethylene and acrylic resin.

The fixing member is not particularly limited, as long as it can apply fixing pressure to the stack in the stacking direction. As the fixing member, a known fixing member that is applicable as the fixing member of solid-state batteries, may be used. For example, a fixing member including two plates sandwiching both surface of the stack, a rod connecting the plates, a controller being connected to the rod and controlling the fixing pressure by a screw structure or the like, may be used. By the controller, the desired fixing pressure can be applied to the stack.

The fixing pressure is not particularly limited. For example, it may be 0.1 MPa or more, may be 1 MPa or more, or may be 5 MPa or more. This is because it is advantageous in that the contact between the layers is easily enhanced by increasing the fixing pressure. On the other hand, the fixing pressure may be 100 MPa or less, may be 50 MPa or less, or may be 20 MPa or less, for example. This is because, when the fixing pressure is too large, there is a possibility that high stiffness is required of the fixing member, and the size of the fixing member is increased.

The solid-state battery may be composed of the single stack, or the solid-state battery may be composed of a stack of the stacks.

The solid-state battery may be a primary battery, or it may be a secondary battery. Among them, the solid-state battery may be a secondary battery. A secondary battery is a battery which can be repeatedly charged and discharged, and it is useful as an in-vehicle battery, for example. The solid-state battery may be a solid-state lithium secondary battery.

As the form of the solid-state battery, examples include, but are not limited to, a coin form, a laminate form, a cylindrical form and a square form.

The solid-state battery of the disclosed embodiments may be produced by the following method, for example. First, the solid electrolyte layer is formed by pressure molding the solid electrolyte material powder. Next, the cathode layer is obtained by pressure molding the cathode mixture powder containing the cathode active material on one surface of the solid electrolyte layer. Then, the anode layer is obtained by pressure molding the anode material powder on one surface of the anode current collector. On a surface of the solid electrolyte layer, which is opposite to the surface on which the cathode layer is formed, an assembly of the anode current collector and the anode layer is attached so that the anode layer is in contact with the solid electrolyte layer. Then, the PTC layer is formed on the cathode current collector. Then, the cathode current collector is attached on a surface of the cathode layer, which is opposite to the solid electrolyte layer, so that the PTC layer is in contact therewith. Accordingly, the solid-state battery of the disclosed embodiments is obtained.

In this case, the press pressure applied for pressure-molding the anode material powder, the solid-state electrolyte material powder and the cathode mixture powder is generally about 1 MPa or more and 600 MPa or less.

The method for applying the pressure is not particularly limited. As the method for applying the pressure, examples include, but are not limited to, the method described above in the formation of the cathode layer.

EXAMPLES

[Production of Anode]

An anode active material (Si particles, average particle diameter 0.5 μm), a sulfide-based solid electrolyte (10LiI-15LiBr-75(0.75$Li_2S$-0.25$P_2S_5$) (mol %), average particle diameter 0.5 μm), an electroconductive material (VGCF-H) and a binder (SBR) were prepared.

The anode active material, the sulfide-based solid electrolyte, the electroconductive material and the binder were weighed in a mass ratio of 47.0:44.6:7.0:1.4, and they were mixed with a dispersion medium (diisobutyl ketone). A mixture thus obtained was dispersed by an ultrasonic homogenizer (UH-50 manufactured by SMT Co., Ltd.), thereby obtaining an anode slurry.

The obtained anode slurry was applied on an anode current collector (Ni foil, thickness 22 μm) by blade coating with an applicator, and the applied anode slurry was dried at 100° C. for 30 minutes to obtain an anode including an anode layer on the anode current collector. Then, the anode slurry was applied to the opposite surface of the anode current collector in the same manner, thereby obtaining a double-sided anode structure including the anode layers on both surfaces of the anode current collector. The thickness of each anode layer was 60 μm.

[Production of Cathode Layer]

A cathode active material coated with $LiNbO_3$ by a tumbling fluidized bed granulating-coating machine ($LiNi_{0.8}Co_{0.15}Al_{0.05}O_2$, average particle diameter 10 μm), a sulfide-based solid electrolyte (10LiI-15LiBr-75(0.75$Li_2S$-0.25$P_2S_5$) (mol %), average particle diameter 0.5 μm), an electroconductive material (VGCF-H) and a binder (SBR) were prepared.

The cathode active material, the sulfide-based solid electrolyte, the electroconductive material and the binder were weighed in a mass ratio of 83.3:14.4:2.1:0.2, and they were mixed with a dispersion medium (diisobutyl ketone).

A mixture thus obtained was dispersed by the ultrasonic homogenizer (UH-50 manufactured by SMT Co., Ltd.), thereby obtaining a cathode slurry. The obtained cathode slurry was applied on a support (aluminum foil, thickness 15 μm) by blade coating with an applicator, and the applied cathode slurry was dried at 100° C. for 30 minutes to form a cathode layer on the support, thereby obtaining a cathode layer-Al foil stack.

The thickness of the cathode layer was 100 μm.

[Production of Solid Electrolyte Layer]

A sulfide-based solid electrolyte (10LiI·15LiBr·75 ($0.75Li_2S·0.25P_2S_5$) (mol %), average particle diameter 2.0 μm) and a binder (SBR) were weighed in a mass ratio of 99.6:0.4, and they were mixed with a dispersion medium (diisobutyl ketone). A mixture thus obtained was dispersed by the ultrasonic homogenizer (UH-50 manufactured by SMT Co., Ltd.), thereby obtaining a solid electrolyte layer slurry. The obtained solid electrolyte layer slurry was applied on an Al foil (thickness 15 μm) by blade coating with an applicator, and the applied solid electrolyte layer slurry was dried at 100° C. for 30 minutes to form a solid electrolyte layer on the Al foil, thereby obtaining a solid electrolyte layer-Al foil stack. The thickness of the solid electrolyte layer was 30 μm.

Example 1

[Production of Ni-Containing PTC Layer]

Carbon black (manufactured by Tokai Carbon Co., Ltd., average primary particle diameter 20 nm) as an electroconductive material, PVDF (KF POLYMER L #9130 manufactured by Kureha Corporation) as a polymer, and Ni particles (average particle diameter 63 nm) were mixed at a volume ratio of 10:60:30 with NMP as a dispersion medium, thereby producing a paste. More specifically, the volume ratio of the Ni to the electroconductive material was controlled to 3:1. The produced paste was applied to an aluminum foil (1N30 manufactured by UACJ Corporation, thickness 15 μm) as a current collector so that the thickness was 5 μm when dried. The applied paste was dried at 60° C. for 10 minutes and then dried in a drying furnace at 100° C. for one hour, thereby obtaining a current collector-PTC layer stack.

[Production of Solid-State Battery]

The double-sided anode structure was cut into a 7.2 cm×7.2 cm layer having a surface area of 51.84 $cm^2$. Also, the solid electrolyte layer-Al foil stack was cut into a 7.2 cm×7.2 cm layer having a surface area of 51.84 $cm^2$. They were attached to each other so that the first anode layer of the anode structure was brought into direct contact with the solid electrolyte layer. They were pressed at 1.6 t/cm. Then, the Al foil was peeled off from the solid electrolyte layer. Next, the cathode layer-Al foil stack was cut into a 7.0 cm×7.0 cm layer having a surface area of 49 $cm^2$. It was attached so that the cathode layer was brought into contact with the solid electrolyte layer. They were pressed at 1.6 t/cm. Then, the Al foil was peeled off from the cathode layer, and a stack thus obtained was pressed at 5 t/cm. Then, the current collector-PTC layer stack was attached to the surface opposite to the solid electrolyte layer of the cathode layer so that the cathode layer and the PTC layer were brought into direct contact with each other. Also, the solid electrolyte layer, the cathode layer, the PTC layer and the cathode current collector were stacked in the same manner as above on the second anode layer of the double-sided anode structure. Accordingly, an electrode stack including the cathode current collector, the PTC layer, the cathode layer, the solid electrolyte layer, the anode layer, the anode current collector, the anode layer, the solid electrolyte layer, the cathode layer, the PTC layer and the cathode current collector in this sequence, was obtained. Terminals were attached to the obtained electrode stack by welding. Then, the electrode stack was laminated to produce a solid-state battery (cell).

Example 2

The PTC layer was produced in the same manner as Example 1, except that Ni particles having an average particle diameter of 150 nm were used. Then, the solid-state battery of Example 2 was produced in the same manner as Example 1.

Comparative Example 1

The PTC layer was produced in the same manner as Example 1, except that in the above-described [Production of Ni-containing PTC layer], the paste was produced by mixing the carbon black (manufactured by Tokai Carbon Co., Ltd., average primary particle diameter 20 nm) as the electroconductive material, the PVDF (KF POLYMER L #9130 manufactured by Kureha Corporation) as the polymer, and Ni particles (average particle diameter 150 nm) at a volume ratio of 10:80:10 with the NMP as the dispersion medium. More specifically, the volume ratio of the Ni to the electroconductive material was controlled to 1:1. Then, the solid-state battery of Comparative Example 1 was produced in the same manner as Example 1.

Comparative Example 2

The PTC layer was produced in the same manner as Example 1, except that in the above-described [Production of Ni-containing PTC layer], the paste was produced by mixing, without the use of Ni particles, the carbon black (manufactured by Tokai Carbon Co., Ltd., average primary particle diameter 20 nm) as the electroconductive material and the PVDF (KF POLYMER L #9130 manufactured by Kureha Corporation) as the polymer at a volume ratio of 10:90 with the NMP as the dispersion medium. Then, the solid-state battery of Comparative Example 2 was produced in the same manner as Example 1.

Comparative Example 3

The Ni-containing PTC layer was not produced, and a carbon coated aluminum foil was prepared as the current collector. The current collector was used as the cathode current collector, and the cathode current collector, the cathode layer, the solid electrolyte layer, the anode layer, the anode current collector, the anode layer, the solid electrolyte layer, the cathode layer and the cathode current collector were arranged in this sequence, thereby producing the solid-state battery of Comparative Example 3. The thickness of the carbon coating was 4 μm.

[Evaluation Method]

The solid-state batteries of Examples 1 and 2 and Comparative Examples 1 to 3 were evaluated by the following nail penetration test and charge-discharge test.

[Charge-Discharge Test]

Each solid-state battery was sized and fixed at a fixing pressure of 5 MPa and charged with constant current and constant voltage (CC-CV) at 0.0194 A to 4.05 V. Then, the battery was discharged with CC-CV at 0.0194 A to 3.0 V. Then, the battery was charged again. This charging was deemed as initial charging.

[Nail Penetration Test]

Each solid-state battery was charged with constant current at ⅓ C to 4.05 V and charged with constant voltage in the condition of 4.05 V and 20 A.

Then, when the solid-state battery was charged with constant voltage at room temperature (25° C.±5° C.) and 4.05 V, an iron nail having a diameter of 3.0 mm and a tip angle of 30 degrees, was stuck into the side of the solid-state battery at a speed of 0.1 mm/sec to cause an internal short circuit. The sneak current of that moment was calculated, and the heat generation amount of the solid-state battery was obtained. The result is shown in Table 1.

The conditions of the nail penetration test are as follows.

Nail speed: 0.1 mm/sec

Fixing pressure: 5 MPa

Applied current: 20 A (maximum mode)

Temperature: Room temperature (25° C.±5° C.)

Nail penetration depth: 0.4 mm to 0.8 mm from the contact position of the iron nail and the cathode Nail: French embroidery needle No. 3 (diameter 3.0 mm)

TABLE 1

| | Ni/Electro-conductive material (Volume ratio) | Material contained in PCT layer | Ni average particle diameter | Heat generation amount (W) |
|---|---|---|---|---|
| Example 1 | 3:1 | Ni particles | 63 nm | 3.5 |
| Example 2 | 3:1 | Ni particles | 150 nm | 0.8 |
| Comparative Example 1 | 1:1 | Ni particles | 150 nm | 40 |
| Comparative Example 2 | — | No Ni added | — | 46 |
| Comparative Example 3 | — | No PCT coating | — | 53 |

[Evaluation Results]

Compared to Comparative Examples 1 to 3, Examples 1 and 2 are low in heat generation amount.

Figure 2:
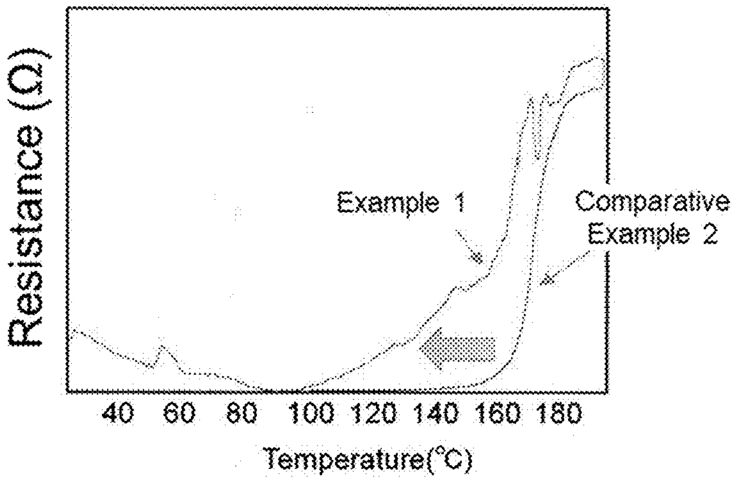
FIG. 2 is a view showing a relationship between the resistance and temperature of each of the solid-state batteries of Example 1 and Comparative Example 2.

FIG. 2 is a view showing a relationship between the resistance and temperature of each of the solid-state batteries of Example 1 and Comparative Example 2.

As shown in FIG. 2, it was revealed that compared to the resistance of the solid-state battery of Comparative Example 2, the resistance of the solid-state battery of Example 1 increases at low temperatures.

REFERENCE SIGNS LIST

11: Anode current collector
12: Anode layer
13: Solid electrolyte layer
14: Cathode layer
15: Cathode current collector
16: PTC layer
100: Solid-state battery

The invention claimed is:

1. A battery-powered electric vehicle comprising an electrode for solid-state batteries, wherein the electrode comprises an electrode layer, a current collector, and a PTC layer which is disposed between the electrode layer and the current collector and which is in contact with the electrode layer;

wherein the PTC layer contains an electroconductive material, Ni and a polymer;

wherein the electroconductive material is a carbonaceous material;

wherein the polymer is a thermoplastic resin;

wherein a volume percent of the electroconductive material in the PTC layer is from 10 volume % to 15 volume %; and wherein a volume percent of the Ni in the PTC layer is from 30 volume % to 35 volume %.

2. The battery-powered electric vehicle according to claim 1, wherein a volume ratio (Ni/electroconductive material) of the Ni to the electroconductive material in the PTC layer, is 3.

3. The battery-powered electric vehicle according to claim 1, wherein the volume percent of the electroconductive material in the PTC layer is 10 volume %; and wherein the volume percent of the Ni in the PTC layer is 30 volume %.

4. The battery-powered electric vehicle according to claim 1, wherein an average particle diameter of particles of the Ni is from 63 nm to 150 nm.

5. The battery-powered electric vehicle according to claim 1, wherein the electrode layer contains a sulfide-based solid electrolyte; and wherein the sulfide-based solid electrolyte is $10LiI\text{-}15LiBr\text{-}75(0.75Li_2S\text{-}0.25P_2S_5)$.

6. The battery-powered electric vehicle according to claim 1, wherein the battery-powered electric vehicle further comprises a solid state battery including the electrode.

* * * * *